United States Patent [19]

Dorbath et al.

[11] Patent Number: 5,589,273
[45] Date of Patent: Dec. 31, 1996

[54] PROCESS AND AGENT FOR THE PRODUCTION OF PURPLE DECORATION

[75] Inventors: Bernd Dorbath, Alzenau; Norbert Giesecke, Bruchköbel; Klaus-Dieter Fritsche, Colditz, all of Germany

[73] Assignee: Cerdec Aktiengesellschaft Keramische Farben, Frankfurt am Main, Germany

[21] Appl. No.: 412,888

[22] Filed: Mar. 29, 1995

[30] Foreign Application Priority Data

Mar. 30, 1994 [DE] Germany .......................... 44 11 103.7

[51] Int. Cl.$^6$ ........................................... B32B 9/00
[52] U.S. Cl. .......................... 428/433; 428/195; 428/201; 428/203; 428/404; 428/472; 524/431; 524/432; 524/433; 427/214; 427/217
[58] Field of Search ..................... 428/207, 403, 428/433, 472, 195, 201, 203, 404; 524/431, 432, 433; 427/214, 217

[56] References Cited

U.S. PATENT DOCUMENTS

| | | | |
|---|---|---|---|
| 3,887,383 | 6/1975 | Nesteruk | 106/1 |
| 4,871,790 | 10/1989 | Lamanna et al. | 523/333 |
| 5,252,522 | 10/1993 | Dorbath et al. | 501/19 |

FOREIGN PATENT DOCUMENTS

| | | |
|---|---|---|
| 0501139 | 9/1992 | European Pat. Off. . |
| 0514073 | 11/1992 | European Pat. Off. . |
| 145163 | 11/1980 | Germany . |
| 3229837 | 4/1987 | Germany . |
| 271792 | 12/1988 | Germany . |
| 3807290 | 12/1990 | Germany . |
| 4106520 | 9/1992 | Germany . |
| 2814383 | 11/1986 | United Kingdom . |
| 2216536 | 10/1989 | United Kingdom . |

OTHER PUBLICATIONS

Yamazaki et al., Patent Abstracts of Japan, vol. 7, No. 131 (C–169) 8 Jun., 1983, JP–A–58 045 137.

*Primary Examiner*—Patrick Ryan
*Assistant Examiner*—Abraham Bahta
*Attorney, Agent, or Firm*—Wenderoth, Lind & Ponack

[57] ABSTRACT

Purple colors based on colloidal gold on stovable substrates and the use thereof for the production of purple decoration on glass, ceramics and porcelain are known. The production of such purple colors is elaborate.

Agents according to the invention should be viewed as pigment precursors, wherein the pigment is formed during firing of the decoration. The agents contain a gold compound, with the exception of gold oxide, which may be decomposed to colloidal gold on firing of the decoration and a finely divided glass flux in a weight ratio of gold to glass flux of between 1:10 and 1:2,000. Preferred agents contain $HAuCl_4$, $Au_2S_3$, $AuCN$ or $KAu(CN)_2$ as the gold compound and a lead-free glass frit as the glass flux.

The agents may be obtained by grinding the glass flux with a gold compound.

Purple decoration is obtained by applying the agent to the substrate to be decorated and storing at 400° to 1,050° C.

34 Claims, No Drawings

PROCESS AND AGENT FOR THE PRODUCTION OF PURPLE DECORATION

This invention relates to a process and agent for the production of purple decoration, wherein the purple colour is based on colloidal gold. The decoration is produced by applying an agent, containing a finely divided glass flux and a gold compound, onto the substrate to be decorated and stoving at 400° to 1,050° C.; the purple colour is formed during firing.

Purple pigments based on ceramic materials and colloidal gold may be obtained in various manners and have long been used for producing purple decoration on stovable substrates, such as in particular glass, porcelain and ceramics.

Until recently, the production of purple pigments comprised several processing stages: (a) precipitation of Cassius gold purple in gel form from aqueous gold salt solutions using reducing agents, customarily tin(II) salts, (b) mixing the moist gold purple with finely ground glass, (c) presintering the mixture at 600° to 800° C., wherein the gold particles are at least partially enclosed in glass and (d) finely grinding the sintered material. DE 41 06 520 teaches a simplified process for the production of such gold pigments: in this process, a very finely divided glass frit in an aqueous suspension, which contains a water-soluble gold compound, is directly coated with colloidal gold by the addition of a reducing agent. The production of purple decoration has thus hitherto been preceded by production of a purple pigment, which comprised at least one chemical reaction stage and a drying process.

According to DE-PS 32 29 837, lamellar particles coated with metal oxides may also be converted into cherry red pigments by coating using organic gold resinates dissolved in organic solvents and firing at 600° C. There is no indication in this document of forming the pigment by using a glass flux, such as glass frits, instead of lamellar particles, nor of using other gold compounds or aqueous gold salt solutions instead of gold resinates, nor even of forming the pigment in situ during firing of the decoration.

GB-A 2 174 383 teaches a process for the production of decoration on glass using a transfer, wherein the decorative layer of the transfer contains a glass frit containing lead, a colouring metal oxide and a printing medium. Gold oxide is cited among the metal oxides, wherein an enamel containing gold oxide produces a ruby colour. There is no suggestion in this document of using another gold compound instead of gold oxide in the decorative layer of the transfer. The document also provides no teaching relating to the production of purple decoration.

A decorative preparation containing a gold compound is known from DE-PS 38 07 290: this is a burnished gold preparation containing polyvinylpyrrolidone and water which contains 10 to 40 wt. % of gold as gold powder and/or a sparingly soluble gold compound; gold mercaptides and gold sulphides are cited as gold compounds. The decoration obtainable by using such preparations has a gold colour, but not a purple colour.

The object of the present invention is to provide a process and an agent suitable for the performance of the same, by means of which purple decoration may simply be produced on stovable substrates. The process for the production of the decoration is intended to render superfluous the prior, separate production of the purple pigment which was hitherto necessary. A further object is to provide methods by which the decoration process may be developed such that decoration of a differing purple hue, namely with a greater blue cast or a greater red cast, may be obtained. A further object of the invention is to vary the process such that high quality, namely chip resistant, crack-free decoration with good adhesion may be obtained on the most varied materials.

This object is achieved by a process for the production of purple decoration on stovable substrates, comprising application of an agent containing at least one gold compound and a finely divided glass flux onto the substrate to be decorated and firing of the substrate provided with the agent at 400° to 1,050° C., which process is characterised in that the agent to be applied contains at least one gold compound, with the exception of gold oxide, which may be decomposed to colloidal gold on firing, and the weight ratio of gold in the gold compound to the glass flux is between 1:10 and 1:2,000.

The remaining claims relate to preferred embodiments of the process and the agents to be used for this purpose in order to match them to specific tasks.

According to the invention, a purple pigment is not used for production of the decoration, but this pigment is instead formed in situ from suitable raw materials, namely a glass flux and a decomposable gold compound, which are applied to the substrate in a suitable manner during the decoration process. Since the stated pigment raw materials are those as were used in known processes for the production of purple pigments, the process according to the invention is distinguished by the feature that it is possible to dispense with separate pigment production. It is also possible by means of the process according to the invention to obtain different purple hues in the decoration at a given gold content by selection of the gold compounds and glass fluxes to be used. Hues may additionally be influenced as desired by also using hue-modifying additives in the agents to be applied to the substrate. The possibility of selecting the glass flux, finely powdered glass frits are preferred, makes it possible optimally to adjust the decoration to be produced to the physical characteristics of the substrate to be decorated, so producing attractive decoration with good service properties.

Stovable substrates to be decorated are taken be those which are sufficiently dimensionally stable at the temperature necessary for firing or which may purposefully be shaped, for example when shaping sheet glass. Glass and porcelain, together with ceramic materials, such as stoneware and earthenware, are thus particularly suitable substrates. In some cases, unfired substrates may be decorated with an agent containing a glass flux and a gold compound and then completely fired, wherein the purple decoration is simultaneously formed. The process may also be used to decorate sufficiently thermally stable metallic substrates, for example by enamelling using an agent according to the invention.

Glass fluxes are taken to be combinations of substances which form a glass layer under the stoving conditions. Preferred glass fluxes are so-called glass frits, namely glasses which were chilled and ground after melting. Mixtures of glass frits and oxide and/or silicate additives which are soluble therein during firing may also be used as a glass flux. As is known, glass frits are available in a very wide range of chemical compositions. Such glass frits also differ in terms of their physical properties, for example in their softening and melting behaviour and their coefficients of expansion $\alpha$. Glass frits which are transparent or opaque, colourless or coloured with colouring oxides may be used in the process according to the invention. Whereas the use of glass frits containing lead was considered necessary in the above-acknowledged prior art process for the production of ruby red decoration using gold oxide, the process according to the invention may also very readily be performed using lead-free glass frits, as are commercially available and have been described in many documents. Glass frits as must be used for decorating glass generally begin to soften at between 450° and 600° C., whilst the softening point for glass frits for decorating ceramic materials and porcelain are preferably between 550° and 700° C. It has proved advantageous if the average particle diameter of the glass flux to be used is between 0.5 and 50 µm, preferably between 1 and 20 µm and in particular between 1 and 10 µm. Particularly finely divided glass frits are used to produce particularly fine, sharply defined decoration.

The organic or inorganic gold compounds which may be used in the process according to the invention are those which, in the presence of the finely divided glass flux, are completely decomposed to colloidal gold while being heated to the actual firing temperature. The decomposition temperature of preferred gold compounds is generally below 300° C., preferably between 150° and 250° C. Both inorganic and organic gold compounds may be used; they may be gold compounds which are soluble or sparingly soluble in water or in organic solvent systems. The agents to be used in the process according to the invention contain one or more gold compounds, in particular those from the series lithium, sodium and potassium dicyanoaurate(I), gold cyanide, tetrahalogenoauric acid, in particular tetrachloroauric acid and hydrates thereof, lithium, sodium and potassium disulphitoaurate(I), gold(III) sulphide, gold(I) thiolates and gold(I) amine complexes. Although gold thiolates and gold amine complexes, as are used in bright gold and burnished gold preparations—see for example EP-A 0 514 073—may be used, readily commercially available inorganic gold compounds, such as in particular tetrachloroauric acid and hydrates thereof, potassium dicyanoaurate, potassium disulphitoaurate, gold cyanide and gold sulphide, are particularly preferred in the process according to the invention.

An essential feature of the process is that, in the agent to be applied to form the decoration, the weight ratio of gold in the form of one or more gold compounds to the glass flux is between 1:10 and 1:2,000; the ratio is preferably between 1:20 and 1:200 and in particular between 1:30 and 1:100.

According to a preferred embodiment of the invention, an agent is used in which the decomposable gold compound is substantially present in adsorbed form on the glass flux. Such an agent may simply be produced by intensively mixing the finely divided glass flux with one or more pulverulent decomposable gold compounds. It is particularly convenient to transform the pulverulent constituents into a homogeneous product by intensive grinding, preferably in a ball mill. Instead of the very simple, but effective dry grinding of the essential constituents of preferred agents according to the invention, it is also possible to mix the gold compound(s) in the form of an aqueous, aqueous/organic or organic solution with the glass flux, wherein the gold compounds are absorbed by the glass flux. The product obtained in this manner may be used immediately or after drying as an agent or substantial constituent of such an agent in the process according to the invention.

During the above-stated dry or moist production process of the agent, an effective quantity of one or more hue-modifying inorganic and/or organic substances may simultaneously be incorporated. The hue-modifying substances are in particular compounds of silver, copper, cobalt, nickel, tin, ruthenium, rhodium, palladium, osmium, iridium and platinum. Compounds of silver, such as silver nitrate, silver carbonate, silver oxalate and silver tartrate are preferred; the presence of silver compounds in the agents shifts the purple hue towards red. The purple may be shifted towards blue and the brilliance of the decoration simultaneously intensified for example by using co-compounds. The quantity of metals of such hue-modifying compounds used is generally between 1 and 10 wt. % relative to the gold. A blue shift of the purple hue may also be achieved by using a cobalt-coloured glass frit or a colourless glass frit containing titanium dioxide or cerium oxide as the glass flux. A blue shift of the purple hue may also be achieved by adding titanium oxide or cerium oxide ($Ce_2O_3$ and/or $CeO_2$) during or after the above-described production of the agent according to the invention.

It has furthermore been established that the purple hue formed during firing of the decoration may also be modified by the presence of certain organic compounds: for example a bluish purple hue may be obtained if the agent used to produce the decoration contains a low molecular weight organic compound, in particular a mono- or disaccharide; a red shift may be achieved with high molecular weight additives, in particular polysaccharides, including pectins, in particular gum arabic. The quantity of the organic hue-modifying substances used may vary over a wide range. The person skilled in the art will determine the effective quantity of the organic hue-modifying substances to be used by investigatory testing, which would in any case be performed in order to select and ascertain the suitability of the glass flux and gold compound(s) to be used. The quantity of the organic hue-modifying substances to be used is customarily between 10 and 500 wt. % relative to the gold compound(s). The hue-modifying organic substances may also be added as a constituent during the above-stated dry or wet production process of the agent. If the agents according to the invention containing glass flux and gold compound(s) contain water, no water-soluble reducing agents may simultaneously be present.

Agents according to the invention may additionally contain a liquid medium if the agent is to have a consistency suitable for printing, brushing, spraying or dipping. The liquid medium may be an aqueous, aqueous/organic or organic solvent system, in which the gold compound(s) and, if present, further auxiliary substances are soluble or insoluble. Organic solvents which may be cited for agents containing no water are in particular terpene hydrocarbons, isoparaffins, together with esters, ketones and alcohols. The medium is preferably aqueous or aqueous/organic, wherein the organic solvents which may be considered are in particular water-soluble alcohols, ethers and esters. Glycols with 2 to 4 C atoms together with oligo- and poly($C_2$ to $C_4$)glycols or mono($C_1$ to $C_4$)alkyl ethers of the stated glycols or oligoglycols are particularly preferably used, together with hydroxycarboxylic acids or lower alkyl esters thereof, such as for example $C_1$ to $C_3$ alkyl lactate.

The liquid medium of liquid to pasty agents according to the invention contains one or more polymeric organic binders in addition to a solvent system. The binder(s) are soluble in the solvent system or dispersed therein. The presence of one or more binders in the agents according to the invention is in particular advantageous when the agent is to be applied to the substrate to be decorated using customary direct and indirect printing processes, in particular screen printing. Convenient binders are polyacrylates, polymethacrylates, polyacrylic acid, polymethacrylic acid, polyvinylpyrrolidone, cellulose ethers, in particular carboxyalkyl and hydroxyalkyl cellulose, polyalkylene glycol, polyvinyl acetate, polyvinyl alcohol, polyamines, alkyd resins and polyurethane resins. The binders may be used in the form of homopolymers or copolymers or block polymers, in each case individually or as mixtures. Resins based on polyvinylpyrrolidone homo- or copolymers, polymethacrylic acid homo- or copolymers or on cellulose ethers are particularly preferred for purely aqueous preparations or those with an elevated water content.

Agents according to the invention, in particular those with a liquid to pasty consistency, may additionally contain customary processing auxiliaries, in particular an effective quantity of anionic, cationic, zwitterionic or preferably non-ionic surfactants, generally 0.01 to 5 wt. %, in particular 0.1 to 2 wt. %, relative to the agent. The presence of a non-ionic wetting agent is particularly convenient in order to prevent excessively rapid settling of the solids suspended in the agent according to the invention. Apart from wetting agents, further surfactants may also be present to modify the rheological properties of the agents. If an oxidation-curable or U/V-curable resin is used, curing accelerators must additionally be present. The stated auxiliaries are each used in an effective quantity.

Since agents according to the invention do not contain the purple pigment, but merely the raw materials necessary for its formation during firing of the decoration, they are substantially colourless, unless a coloured glass frit is used. During application of the agent, the problem thus arises that the appearance of the decoration cannot be assessed before firing. In order to overcome this problem and so make it possible to apply a decoration manually and to detect possible errors, for example occurring during multi-colour printing, prior to firing, it has proved very convenient to impart an intrinsic colour to the agents according to the invention, which have a pulverulent consistency or, in the presence of a medium, a printable, sprayable or grindable consistency, by adding an organic colorant. The organic colorant, which is added to the agent in an effective quantity, may be any desired organic colorant of the pigment type or soluble in the medium. The person skilled in the art will select such a colorant which is completely combusted during firing or during heating to the firing temperature.

Agents according to the invention with a content of a liquid medium generally contain, depending upon the desired method of application, between 10 and 90 wt. % of the raw materials, glass flux and gold compound(s), necessary for formation of the pigment. If the liquid medium of the agent also contains one or more organic binders in addition to one or more solvents or suspending agents, the content of glass flux and gold compound(s) is together generally below 85 wt. %. The person skilled in the art is aware that the required processing viscosity of a paste is largely dependent upon the fineness of the glass flux, the nature of the solvent or suspending agent and the quantity and thickening effect of the binders present. If the agent contains one or more organic binders, the binder content is customarily between 0.1 and 30 wt. %, generally between 1 and 15 wt. %. The person skilled in the art will thus determine the desired properties of the agent for the particular application by investigatory testing.

Agents according to the invention which contain no liquid medium, which are thus pulverulent, may be applied directly onto the substrate to be decorated using powder techniques known in the ceramics sector, for example by sprinkling onto a dry or previously moistened substrate, wherein the moistening may be a wet layer of glaze. If is also possible to apply the pulverulent agents according to the invention onto the surface to be decorated by electrostatic powder coating.

Pasty or otherwise liquid agents according to the invention are applied to the substrate to be decorated by generally customary methods, for example by painting, spraying or printing by direct or indirect printing processes. Once any solvents present have evaporated and, if necessary, any binders have crosslinked, the actual firing of the decoration takes place, unless other decorative preparations are applied to the substrate as part of further decorative measures.

A customary decorative technique in the ceramics industry involves the use of transfers. The agents according to the invention may consequently also be applied to the substrate to be decorated in the form of transfers. In this case, the transfer comprises a support, a water-soluble release layer or thermal release layer, a decorative layer, which contains an agent according to the invention and a film layer. The layers arranged in the stated sequence are produced in a known manner. The decorative layer is customarily produced by screen printing processes, wherein a medium containing an agent according to the invention is used. After drying of the decorative layer, this layer contains a finely powdered glass flux, preferably a glass frit, at least one decomposable gold compound, with the exception of gold oxide, and in general also one or more organic binders. The decorative layer may additionally contain effective quantities of hue-modifying additives, organic colorants and customary processing auxiliaries, such as wetting agents, viscosity regulators, curing accelerators for the binders and anti-skinning agents. In order to achieve the flexibility of the transfer necessary for the application, decorative layers with an elevated binder content may additionally contain an effective quantity of known plasticisers, such as phthalates, trialkyl phosphates and dicarboxylic acid esters.

The essential advantages of the process according to the invention and of the agent to be used for performance of the same are that it is not the purple pigments per se which are used in the agents, but instead the raw materials thereof, so that pigment production, which is otherwise performed beforehand, is not necessary. Furthermore, it is possible thanks to the choice of materials in terms of the glass flux and the gold compounds as well as the hue-modifying additives to produce purple decoration with a redder or bluer hue in a simple manner. Finally, the glass frits to be used in the agents may be optimally adjusted to the substrate to be decorated, such that chips and cracks in the decoration may be avoided.

The agents according to the invention are also distinguished by the fact that the resultant purple colour is only slightly influenced by firing conditions. Temperature differences of 50° C. or differences in firing time of 1 hour give rise to virtually imperceptible colour differences. Thanks to the absence of a chemical reaction stage for a separate purple production stage, measures for effluent treatment and noble metal recovery from filtrates are also superfluous. The process for the production of the agents according to the invention is simple and safe and ensures consistent product quality.

EXAMPLE 1

50 g of a finely ground glass frit (90%<50 µm) are mixed with 3.1 g of gold sulphide ($Au_2S_3$) and homogenised for 15 minutes in a (Bloch-Rosetti) ball mill. The mixture contains 5 wt. % of gold relative to the glass frit.

For the purposes of application, the mixture containing the glass frit and gold compound is converted into a screen-printable paste by using a screen printing medium (medium 80820 from Cerdec AG) containing methacrylate resin, plasticising esters and hydrocarbon solvents—5 parts by weight of solid, 4 parts by weight of printing medium. The paste is screen-printed onto porcelain, stoving is for 1 hour at 600° C., the resultant decoration is of a bright purple colour.

EXAMPLE 2

50 g of a lead-free glass frit with a grain distribution of 90%<20 µm are mixed with 0.57 g of gold cyanide and homogenised for 1 hour in a ball mill. The mixture contains 1 wt. % of gold relative to the glass frit. The product mixture is transformed into a printable paste using the medium stated in example 1; stoving is at 600° C. for 2 hours. The resultant decoration is purple.

EXAMPLE 3

50 g of a lead-free glass frit with a grain distribution of 90%<10 µm (transparent flux n° 10150 from Cerdec AG, beginning of softening 670° C.) are mixed with 0.86 g of tetrachloroauric acid ($HAuCl_4$) and homogenised in the ball mill—gold content 1% relative to the flux. 5 parts by weight of the mixture are mixed to a paste with 4 parts by weight of the medium stated in example 1. The screen printing paste is screen-printed onto a porcelain substrate; storing is at 800° C. for 30 minutes. A brilliant purple decoration is obtained.

EXAMPLE 4

A lead-free glass frit with a particle distribution of 90%<5 µm is coated with 2% gold, relative to the glass frit, using 1.47 g of potassium dicyanoaurate ($KAu(CN)_2$) in a ball mill. A printable paste is produced in a customary manner using the medium containing methacrylate and the paste applied onto porcelain. Storing is performed at a heating rate of 410 K/h up to 800° C. and this temperature is maintained for 12 minutes. The resultant decoration is of a bright purple colour.

EXAMPLE 5

50 g of a high temperature fast-firing frit with a grain distribution of 90%<10 µm are suspended in an aqueous solution (100 ml) containing $Na_3Au(SO_3)_2$—gold content 2 wt. % relative to the frit. The aqueous mixture is dried and then mixed to a paste with a printing medium containing ethyl cellulose and dipropylene glycol monomethyl ether—5 parts by weight of solid, 4 parts by weight of medium. After application of the screen printing paste onto porcelain and stoving—heating rate 400 K/h, firing temperature 800° C., holding time 0.5 h—a crimson decoration is obtained.

EXAMPLE 6

A glass flux based on a lead borosilicate is sprayed with an aqueous solution containing $Na_3Au(SO_3)_2$—gold content 0.1 wt. %, relative to the frit. After drying, the product is mixed to a paste with the medium stated in example 5 and applied. The decoration is purple after 30 minutes at 600° C.

EXAMPLE 7

A lead-free glass frit based on $SiO_2$, $B_2O_3$, $Na_2O$ and $TiO_2$, wherein the $TiO_2$ content is 10 wt. %, is coated with 1 wt. % of gold by homogenising the glass frit and gold cyanide in a ball mill. After dry application onto porcelain and onto a ceramic body, purple decoration with a strong blue cast is obtained on stoving. Colour formation is virtually identical at a maximum firing temperature of 820° C. and at a maximum firing temperature of 870° C. This slight colour difference as a function of firing temperature is a substantial advantage of the agents according to the invention because slight differences in firing temperature have virtually no effect on the colour location.

EXAMPLE 8

50 g of a lead-free glass flux with a particle distribution of 90%<5 µm, 1.47 g of potassium dicyanoaurate and 0.25 g of iron(III) oxide as a hue-modifying compound are mixed together and homogenised in a ball mill for two hours. The resultant mixture is mixed to a paste with the printing medium stated in example 1 and applied to porcelain: maximum firing temperature 800° C., firing time 0.2 h. A purple decoration with a strong red cast is obtained.

EXAMPLE 9

A lead-free glass flux is coated with 2 wt. % of gold by spraying with an aqueous $Na_3Au(SO_3)_2$ solution; after drying, silver carbonate is added in a quantity of 0.1 wt. % relative to the product containing glass flux and gold compound. Once the three-substance mixture has been homogenised, mixed to a paste using a printing medium containing ethyl cellulose and applied to porcelain, it is stored at 800° C. for a holding time of 0.5 h. A purple decoration with a red cast is obtained.

EXAMPLE 10

50 g of a high temperature rapid-firing flux, 0.86 g of tetrachloroauric acid and 0.5 g of titanium dioxide as a hue-modifying compound are mixed together and homogenised in a ball mill. Once the homogenised product mixture has been mixed to a paste with a printing medium containing methacrylate and applied to porcelain, a purple decoration with an intense blue cast is obtained at a heating rate of 400 K/h, a maximum firing temperature of 1,000° C. and firing time of 1 h.

We claim:

1. A process for the production of purple decoration on a stovable substrate which comprises applying an agent containing at least one gold compound and a finely divided glass flux onto a substrate to be decorated and firing the resultant substrate at a temperature of 400° to 1,050° C., wherein
   the agent to be applied contains at least one gold compound, with the exception of gold oxide, which is decomposed to colloidal gold on firing, and the weight ratio of gold in the gold compound to the glass flux is between 1:10 and 1:2,000.

2. A process according to claim 1, wherein the agent to be used contains a gold compound selected from the group consisting of Li, Na and K dicyanoaurate(I), gold cyanide, tetrahalogenoauric acid, Li, Na and K disulphitoaurate(I), gold(III) sulphide, gold(I) thiolates and gold(I) amine complexes.

3. A process according to claim 2 wherein the gold compound is $HAuCl_4$ or a hydrate thereof.

4. A process according to claim 1, 2 or 3, wherein the agent to be used contains a lead-free glass frit as the glass flux.

5. A process according to claim 4 wherein the glass frit has a softening point in the range of between 450° and 700° C.

6. A process according to claim 1, 2 or 3 wherein the agent to be used contains gold in the gold compound and glass flux in a weight ratio of between 1:20 and 1:200.

7. A process according to claim 6 wherein the glass flux is a glass frit.

8. A process according to claim 4 wherein the agent to be used contains gold in the gold compound and glass flux in a weight ratio of between 1:20 and 1:200.

9. A process according to claim 1, 2 or 3 wherein the agent to be used additionally contains a liquid medium.

10. A process according to claim 9 wherein the liquid medium contains a polymeric organic binder and an organic, an organic/aqueous or purely aqueous solvent or suspending agent system.

11. A process according to claim 1, 2 or 3 wherein the agent to be used additionally contains an effective quantity of at least one hue-modifying inorganic and/or organic substance, or at least one hue-modifying substance is applied onto the agent previously applied to the substrate.

12. A process according to claim 1, 2 or 3 wherein the agent to be used additionally contains an effective quantity of a processing auxiliary.

13. A process according to claim 12 wherein the processing auxiliary is at least one member selected from the group consisting of a substance to establish the rheological properties of a pulverulent, liquid or pasty agent and an organic colorant for assessment of the decoration before firing.

14. A process according to claim 1, 2 or 3 wherein the agent to be used contains the decomposable gold compound substantially in adsorbed form on the glass flux.

15. A process according to claim 14 wherein the glass flux is a glass frit.

16. An agent for the production of purple decoration on a stovable substrate, comprising a gold compound and a finely divided glass flux, wherein said agent contains a gold compound, with the exception of gold oxide, which is decomposed to colloidal gold on firing of the decoration on the substrate and the weight ratio of gold in the gold compound to the glass flux is between 1:10 and 1:2,000.

17. An agent according to claim 16,
wherein the agent contains a gold compound selected from the group consisting of Li, Na and K dicyanoaurate(I), gold cyanide, tetrahalogenoauric acid, Li, Na and K disulphitoaurate(I), gold(III) sulphide, gold(I) thiolates and gold(I) amine complexes.

18. An agent according to claim 17 wherein the gold compound is $HAuCl_4$ or a hydrate thereof.

19. An agent according to claim 16, 17 or 18, wherein the agent contains a lead-free glass frit as the glass flux.

20. An agent according to claim 19 wherein the glass frit having a softening point in the range of between 450° and 700° C.

21. An agent according to claim 15, 16 or 17 wherein the weight ratio of gold in the gold compound to glass flux is between 1:20 and 1:200.

22. An agent according to claim 21 wherein the glass flux is a glass frit.

23. An agent according to claim 15, 16 or 17 wherein the agent contains the decomposable gold compound substantially in adsorbed form on the glass flux.

24. An agent according to claim 15, 16 or 17 wherein at least 90% of the finely divided glass flux has a particle size of less than 50 μm.

25. An agent according to claim 24 wherein the particle size is less than 10 μm.

26. An agent according to claim 15, 16 or 17 wherein the agent additionally contains a liquid medium.

27. An agent according to claim 26 wherein the liquid medium contains a polymeric organic binder and an aqueous, organic/aqueous or organic solvent or suspending agent system and the agent has a printable, brushable, sprayable or dippable consistency.

28. An agent according to claim 15, 16 or 17 wherein the agent additionally contains an effective quantity of an organic colorant and/or at least one customary processing auxiliary for pulverulent, pasty or liquid agents.

29. An agent according to claim 26 wherein the agent additionally contains an effective quantity of an organic colorant and/or at least one customary processing auxiliary for pulverulent, pasty or liquid agents.

30. An agent according to claim 15, 16 or 17 wherein the agent
additionally contains an effective quantity of at least one hue-modifying inorganic or organic substance.

31. An agent according to claim 30 wherein the hue-modifying inorganic substance is selected from the group consisting of a silver compound, an iron oxide and a titanium dioxide.

32. An agent according to claim 30 wherein the hue-modifying organic substance is a mono-, di- or polysaccharide.

33. A transfer for the production of purple decoration on a stovable substrate, comprising in the stated sequence a support, a water-soluble or thermal release layer, a decorative layer and a film layer, wherein the decorative layer contains an agent according to claim 15, 16 or 17 in dry form.

34. A process for the production of an agent according to claim 15, 16 or 17, comprising homogenizing the constituents of the agent, wherein either the glass flux and the decomposable gold compound are first intensively ground together or an aqueous, organic/aqueous or organic solution of the gold compound is first mixed with the glass flux and the mixture is dried and then, if necessary, the glass flux containing the gold compound substantially in adsorbed form is combined with further constituents of the agent and homogenized.

* * * * *